(12) United States Patent
Liao

(10) Patent No.: US 8,316,007 B2
(45) Date of Patent: Nov. 20, 2012

(54) AUTOMATICALLY FINDING ACRONYMS AND SYNONYMS IN A CORPUS

(75) Inventor: Ciya Liao, Fremont, CA (US)

(73) Assignee: Oracle International Corporation, Redwood Shores, CA (US)

(*) Notice: Subject to any disclaimer, the term of this patent is extended or adjusted under 35 U.S.C. 154(b) by 190 days.

(21) Appl. No.: 11/770,011

(22) Filed: Jun. 28, 2007

(65) Prior Publication Data
US 2009/0006359 A1    Jan. 1, 2009

(51) Int. Cl.
*G06F 17/30* (2006.01)
(52) U.S. Cl. ............... 707/709; 704/9; 704/10; 707/748
(58) Field of Classification Search ............... 704/10, 704/9; 707/104.1, 709, 748
See application file for complete search history.

(56) References Cited

U.S. PATENT DOCUMENTS

| | | | |
|---|---|---|---|
| 5,493,677 A | 2/1996 | Balogh et al. | |
| 5,751,949 A | 5/1998 | Thomson et al. | |
| 5,845,278 A | 12/1998 | Kirsch et al. | |
| 5,884,312 A | 3/1999 | Dustan et al. | |
| 5,926,808 A | 7/1999 | Evans et al. | |
| 5,987,482 A | 11/1999 | Bates et al. | |
| 6,006,217 A | 12/1999 | Lumsden | |
| 6,012,053 A | 1/2000 | Pant et al. | |
| RE36,727 E | 6/2000 | Kageneck et al. | |
| 6,094,649 A | 7/2000 | Bowen et al. | |
| 6,182,142 B1 | 1/2001 | Win et al. | |
| 6,185,567 B1 | 2/2001 | Ratnaraj et al. | |
| 6,236,991 B1 | 5/2001 | Frauenhofer et al. | |
| 6,301,584 B1 | 10/2001 | Ranger | |
| 6,326,982 B1 | 12/2001 | Wu et al. | |
| 6,356,897 B1 | 3/2002 | Gusack | |
| 6,424,973 B1 | 7/2002 | Baclawski | |
| 6,631,369 B1 | 10/2003 | Meyerzon et al. | |
| 6,671,681 B1 | 12/2003 | Emens et al. | |
| 6,678,683 B1 | 1/2004 | Shiiyama | |
| 6,678,731 B1 | 1/2004 | Howard et al. | |
| 6,711,568 B1 | 3/2004 | Bharat et al. | |
| 6,734,886 B1 | 5/2004 | Hagan et al. | |
| 6,735,585 B1 | 5/2004 | Black et al. | |
| 6,754,873 B1 | 6/2004 | Law et al. | |
| 6,757,669 B1 | 6/2004 | Adar et al. | |
| 6,766,314 B2 | 7/2004 | Burnett | |
| 6,826,597 B1 | 11/2004 | Lonnroth et al. | |

(Continued)

OTHER PUBLICATIONS

Article entitled "Clustering acronyms in biomedical text for disambiguation", dated 2006, by Okazaki et al.*

(Continued)

*Primary Examiner* — Mahesh Dwivedi
(74) *Attorney, Agent, or Firm* — Kilpatrick Townsend & Stockton LLP

(57) ABSTRACT

Acronym and synonym pairs can be identified and retrieved automatically in a corpus and/or across an enterprise based on customer settings globally or for a single instance. Possible acronym and synonym term pairs can be identified using a rule such as a heuristic, user-defined rule. Rules selected by the user can be used to rank acronym and synonym pairs using factors such as occurrence frequency and maximum term length. A rule interpreter engine executes the user defined rule set to properly identify and retrieve the user selected acronym and synonym pairs through the utilization of a shallow pause read step. Finally, the user selected acronym and synonym pairs are ranked according to the user preferences, and can be displayed or held for subsequent use in searching.

13 Claims, 9 Drawing Sheets

U.S. PATENT DOCUMENTS

| | | | |
|---|---|---|---|
| 6,847,977 | B2 | 1/2005 | Abajian |
| 6,848,077 | B1 | 1/2005 | McBrearty et al. |
| 6,865,608 | B2 | 3/2005 | Hunter |
| 6,928,166 | B2 | 8/2005 | Yoshizawa |
| 6,978,275 | B2 * | 12/2005 | Castellanos et al. ........ 707/102 |
| 7,031,954 | B1 | 4/2006 | Kirsch |
| 7,100,207 | B1 | 8/2006 | Prager |
| 7,110,983 | B2 | 9/2006 | Shear et al. |
| 7,113,939 | B2 | 9/2006 | Chou et al. |
| 7,136,876 | B1 * | 11/2006 | Adar et al. ............ 707/104.1 |
| 7,236,923 | B1 * | 6/2007 | Gupta ........................ 704/9 |
| 7,257,577 | B2 | 8/2007 | Fagin et al. |
| 7,287,214 | B1 | 10/2007 | Jenkins et al. |
| 7,305,475 | B2 | 12/2007 | Tock |
| 7,340,454 | B2 | 3/2008 | Wu et al. |
| 7,370,381 | B2 | 5/2008 | Tuttle et al. |
| 7,373,351 | B2 | 5/2008 | Wu et al. |
| 7,437,351 | B2 | 10/2008 | Page |
| 7,472,113 | B1 | 12/2008 | Watson et al. |
| 7,493,301 | B2 | 2/2009 | Palmon et al. |
| 7,584,120 | B1 | 9/2009 | Yun et al. |
| 7,627,564 | B2 | 12/2009 | Yao et al. |
| 7,636,714 | B1 | 12/2009 | Lamping et al. |
| 7,640,196 | B2 | 12/2009 | Weiss |
| 7,680,819 | B1 | 3/2010 | Mellmer et al. |
| 7,711,676 | B2 | 5/2010 | Stuhec |
| 7,716,243 | B2 | 5/2010 | Schwartz et al. |
| 7,725,465 | B2 | 5/2010 | Liao et al. |
| 7,743,064 | B2 | 6/2010 | Faulkner et al. |
| 7,752,221 | B2 | 7/2010 | Krishnaprasad et al. |
| 7,822,733 | B2 | 10/2010 | Son |
| 7,941,419 | B2 | 5/2011 | Bhatkar et al. |
| 7,970,791 | B2 | 6/2011 | Liao et al. |
| 7,996,392 | B2 | 8/2011 | Liao et al. |
| 8,005,816 | B2 | 8/2011 | Krishnaprasad et al. |
| 8,027,982 | B2 | 9/2011 | Ture et al. |
| 2001/0039563 | A1 | 11/2001 | Tian |
| 2001/0042075 | A1 | 11/2001 | Tabuchi |
| 2002/0099731 | A1 | 7/2002 | Abajian |
| 2002/0103786 | A1 | 8/2002 | Goel |
| 2002/0174122 | A1 | 11/2002 | Chou et al. |
| 2002/0178394 | A1 | 11/2002 | Bamberger |
| 2002/0184170 | A1 | 12/2002 | Gilbert et al. |
| 2003/0014483 | A1 | 1/2003 | Stevenson et al. |
| 2003/0051226 | A1 | 3/2003 | Zimmer et al. |
| 2003/0055816 | A1 | 3/2003 | Paine et al. |
| 2003/0065670 | A1 | 4/2003 | Bisson et al. |
| 2003/0069880 | A1 | 4/2003 | Harrison et al. |
| 2003/0074328 | A1 | 4/2003 | Schiff et al. |
| 2003/0074354 | A1 | 4/2003 | Lee et al. |
| 2003/0105966 | A1 | 6/2003 | Pu et al. |
| 2003/0126140 | A1 | 7/2003 | Engelhardt-Cronk et al. |
| 2003/0130993 | A1 | 7/2003 | Mendelevitch et al. |
| 2003/0139921 | A1 * | 7/2003 | Byrd et al. .................... 704/10 |
| 2003/0177388 | A1 | 9/2003 | Botz et al. |
| 2003/0204501 | A1 | 10/2003 | Moon |
| 2003/0208547 | A1 | 11/2003 | Branimir |
| 2003/0208684 | A1 | 11/2003 | Camacho et al. |
| 2003/0220917 | A1 | 11/2003 | Copperman et al. |
| 2004/0006585 | A1 | 1/2004 | Paulus et al. |
| 2004/0041019 | A1 | 3/2004 | Schneider et al. |
| 2004/0044952 | A1 | 3/2004 | Jiang et al. |
| 2004/0062426 | A1 | 4/2004 | Lo |
| 2004/0064340 | A1 | 4/2004 | Johnston |
| 2004/0064687 | A1 | 4/2004 | Pfitzmann et al. |
| 2004/0078371 | A1 | 4/2004 | Worrall et al. |
| 2004/0088313 | A1 | 5/2004 | Torres |
| 2004/0093331 | A1 * | 5/2004 | Garner et al. .................... 707/3 |
| 2004/0122811 | A1 | 6/2004 | Page |
| 2004/0158527 | A1 | 8/2004 | Lambert |
| 2004/0168066 | A1 | 8/2004 | Alden |
| 2004/0199491 | A1 | 10/2004 | Bhatt |
| 2004/0225643 | A1 | 11/2004 | Alpha et al. |
| 2004/0230572 | A1 | 11/2004 | Omoigui |
| 2004/0260685 | A1 | 12/2004 | Pfleiger et al. |
| 2005/0004943 | A1 | 1/2005 | Chang |
| 2005/0015381 | A1 | 1/2005 | Clifford et al. |
| 2005/0015466 | A1 | 1/2005 | Tripp et al. |
| 2005/0050037 | A1 | 3/2005 | Frieder et al. |
| 2005/0060297 | A1 | 3/2005 | Najork |
| 2005/0102251 | A1 | 5/2005 | Gillespie |
| 2005/0108207 | A1 | 5/2005 | Thuerk |
| 2005/0114226 | A1 | 5/2005 | Tripp et al. |
| 2005/0114324 | A1 | 5/2005 | Mayer |
| 2005/0119999 | A1 | 6/2005 | Zait et al. |
| 2005/0154730 | A1 | 7/2005 | Miller et al. |
| 2005/0187937 | A1 | 8/2005 | Kawabe et al. |
| 2005/0210017 | A1 | 9/2005 | Cucerzan |
| 2005/0216465 | A1 | 9/2005 | Dutta et al. |
| 2005/0234859 | A1 | 10/2005 | Ebata |
| 2005/0262050 | A1 | 11/2005 | Fagin et al. |
| 2006/0023945 | A1 | 2/2006 | King et al. |
| 2006/0036598 | A1 | 2/2006 | Wu |
| 2006/0064411 | A1 | 3/2006 | Gross et al. |
| 2006/0075120 | A1 | 4/2006 | Smit |
| 2006/0080316 | A1 | 4/2006 | Gilmore et al. |
| 2006/0123472 | A1 | 6/2006 | Schmidt et al. |
| 2006/0129538 | A1 | 6/2006 | Baader et al. |
| 2006/0136194 | A1 | 6/2006 | Armstrong et al. |
| 2006/0136405 | A1 | 6/2006 | Ducatel et al. |
| 2006/0167857 | A1 | 7/2006 | Kraft et al. |
| 2006/0167860 | A1 | 7/2006 | Eliashberg et al. |
| 2006/0195914 | A1 | 8/2006 | Schwartz et al. |
| 2006/0212423 | A1 | 9/2006 | Jones et al. |
| 2006/0224627 | A1 | 10/2006 | Manikutty et al. |
| 2006/0229911 | A1 | 10/2006 | Gropper et al. |
| 2006/0230022 | A1 | 10/2006 | Bailey et al. |
| 2006/0271568 | A1 | 11/2006 | Balkir et al. |
| 2006/0294077 | A1 | 12/2006 | Bluhm et al. |
| 2007/0016583 | A1 | 1/2007 | Lempel et al. |
| 2007/0016625 | A1 * | 1/2007 | Berstis ...................... 707/200 |
| 2007/0061393 | A1 | 3/2007 | Moore |
| 2007/0094210 | A1 | 4/2007 | Craig et al. |
| 2007/0094710 | A1 | 4/2007 | Walker et al. |
| 2007/0100915 | A1 | 5/2007 | Rose et al. |
| 2007/0150515 | A1 | 6/2007 | Brave et al. |
| 2007/0156669 | A1 | 7/2007 | Marchisio et al. |
| 2007/0208712 | A1 | 9/2007 | Krishnaprasad et al. |
| 2007/0208713 | A1 | 9/2007 | Krishnaprasad et al. |
| 2007/0208714 | A1 | 9/2007 | Ture et al. |
| 2007/0208726 | A1 | 9/2007 | Krishnaprasad et al. |
| 2007/0208734 | A1 | 9/2007 | Koide et al. |
| 2007/0208744 | A1 | 9/2007 | Krishnaprasad et al. |
| 2007/0208745 | A1 | 9/2007 | Ture et al. |
| 2007/0208746 | A1 | 9/2007 | Koide et al. |
| 2007/0208755 | A1 | 9/2007 | Bhatkar et al. |
| 2007/0209080 | A1 | 9/2007 | Ture et al. |
| 2007/0214129 | A1 | 9/2007 | Ture et al. |
| 2007/0220037 | A1 * | 9/2007 | Srivastava et al. ............ 707/102 |
| 2007/0220268 | A1 | 9/2007 | Krishnaprasad et al. |
| 2007/0226695 | A1 | 9/2007 | Krishnaprasad et al. |
| 2007/0250486 | A1 | 10/2007 | Liao et al. |
| 2007/0276801 | A1 | 11/2007 | Lawrence et al. |
| 2007/0283425 | A1 | 12/2007 | Ture et al. |
| 2008/0086297 | A1 * | 4/2008 | Li et al. ............................ 704/3 |
| 2008/0114721 | A1 | 5/2008 | Jones et al. |
| 2008/0168037 | A1 | 7/2008 | Kapadia et al. |
| 2008/0222138 | A1 | 9/2008 | Liu et al. |
| 2010/0185611 | A1 | 7/2010 | Liao et al. |
| 2011/0246443 | A1 | 10/2011 | Bhatkar et al. |
| 2011/0258184 | A1 | 10/2011 | Liao et al. |
| 2011/0265189 | A1 | 10/2011 | Liao et al. |

OTHER PUBLICATIONS

Article entitled "Acrophile: An Automated Acronym Extractor and Server", Copyright 2000, by Larkey et al.*
Article entitled "Building an Abbreviation Dictionary Using a Term Recognition Approach", dated Oct. 18, 2006, by Okazaki et al.*
Article entitled "Using SVM to extract acronyms from text", by Xu et al., dated Apr. 20, 2006.*
Article entitled "Automatic Expansion of Abbreviations by using Context and Character Information", by Terada et al., dated Aug. 9, 2002.*
Article entitled "Chinese Language IR based on Term Extraction", by Donghong et al., Copyright 2003.*
Article entitled "Dates", by Boostrap, dated 2006.*

Article entitled "An Application of Extended Simulated Annealing Algorithm to Generate the Learning Data Set for Speech Recognition System", Copyright 2001 by Song.*

Booth et al. "Web Services Architecture," Feb. 2004, W3C, Table of Contents and Section 3.4.2.2, 6 pages, http://www.w3.org/TR/ws-arch/.

IEEE, "The Authoritative Dictionary of IEEE Standards Terms," Dec. 2000, Standards Information Network IEEE Press, 7$^{th}$ Edition, pp. 1-4.

ComputerUser, Definition of "crawler." Sep. 21, 2009, www.computeruser.com, 1 page.

Sun, "The Java Tutorials, Inheritance," Sep. 23, 2009, A Sun Developer Network Site, http://java.sun.com/docs/books/tutorial/java/IandI/subclasses.html, pp. 1-5.

Hawking et al., "Efficient and Flexible Search Using Test and Metadata," CSIRO Mathematical and Information Sciences Technical Report 2000/83, 13 pages.

"Oracle Secure Enterprise Search," Administrators Guide, 10g Release 1 (10.1.6) B 192002-02, Mar. 2006.

Oracle Corporation, Oracle Database 10g, Oracle High Availability, Sep. 2006, pp. 1-12, Oracle Corp., Redwood Shores, CA, US.

Oracle Corporation, Oracle Secure Enterprise Search 10g, An Oracle Technical White Paper, Mar. 2006, pp. 1-20, Oracle Corp., Redwood Shores, CA, US.

Oracle Corporation, Oracle Secure Enterprise Search 10g, One Search Across Your Enterprise Repositories, Mar. 2006, pp. 1-10, Oracle Corp., Redwood Shores, CA, US.

U.S. Appl. No. 11/648,981, Non-Final Office Action dated Dec. 11, 2008, 13 pages.

U.S. Appl. No. 11/648,981, Final Office Action dated May 7, 2009, 16 pages.

U.S. Appl. No. 11/649,010, Non-Final Office Action dated Nov. 7, 2008, 12 pages.

U.S. Appl. No. 11/649,010, Final Office Action dated Apr. 17, 2009, 10 pages.

U.S. Appl. No. 11/649,010, Non-Final Office Action dated Oct. 2, 2009, 6 pages.

U.S. Appl. No. 11/649,098, Non-Final Office Action dated Jul. 24, 2009, 12 pages.

U.S. Appl. No. 11/649,010, Notice of Allowance dated Apr. 5, 2010, 7 pages.

U.S. Appl. No. 11/649,098, Final Office Action dated Feb. 19, 2010, 13 pages.

U.S. Appl. No. 11/680,530, Non-Final Office Action dated Mar. 10, 2010, 25 pages.

U.S. Appl. No. 11/680,530, Final Office Action dated Jul. 12, 2010, 24 pages.

U.S. Appl. No. 11/680,530, Advisory Action dated Sep. 8, 2010, 3 pages.

U.S. Appl. No. 11/737,091, Non-Final Office Action dated Apr. 9, 2009, 9 pages.

U.S. Appl. No. 11/737,091, Final Office Action dated Oct. 16, 2009, 9 pages.

U.S. Appl. No. 11/737,091, Advisory Action dated Dec. 23, 2009, 3 pages.

U.S. Appl. No. 11/737,091, Notice of Allowance dated Feb. 25, 2010, 4 pages.

U.S. Appl. No. 12/751,268, Non-Final Office Action dated Nov. 15, 2010, 7 pages.

U.S. Appl. No. 11/680,558, Non-Final Office Action dated Apr. 14, 2009, 15 pages.

U.S. Appl. No. 11/680,558, Final Office Action dated Oct. 9, 2009, 15 pages.

U.S. Appl. No. 11/680,558, Advisory Action dated Dec. 17, 2009, 3 pages.

U.S. Appl. No. 11/680,558, Non-Final Office Action dated Feb. 17, 2010, 15 pages.

U.S. Appl. No. 11/680,558, Final Office Action dated Jul. 8, 2010, 12 pages.

U.S. Appl. No. 11/680,558, Advisory Action dated Aug. 18, 2010, 3 pages.

U.S. Appl. No. 11/680,545, Non-Final Office Action dated Mar. 17, 2010, 27 pages.

U.S. Appl. No. 11/680,545, Final Office Action dated Jul. 19, 2010, 33 pages.

U.S. Appl. No. 11/680,550, Non-Final Office Action dated Feb. 20, 2009, 11 pages.

U.S. Appl. No. 11/680,550, Non-Final Office Action dated Jul. 8, 2009, 12 pages.

U.S. Appl. No. 11/680,550, Final Office Action dated Jan. 8, 2010, 13 pages.

U.S. Appl. No. 11/680,550, Advisory Action dated Apr. 2, 2010, 3 pages.

U.S. Appl. No. 11/680,550, Non-Final Office Action dated Jun. 22, 2010, 13 pages.

U.S. Appl. No. 11/680,550, Notice of Allowance dated Jan. 4, 2011, 8 pages.

U.S. Appl. No. 11/680,559, Non-Final Office Action dated Dec. 8, 2008, 34 pages.

U.S. Appl. No. 11/680,559, Final Office Action dated Jul. 8, 2009, 21 pages.

U.S. Appl. No. 11/680,559, Advisory Action dated Sep. 11, 2009, 3 pages.

U.S. Appl. No. 11/680,559, Non-Final Office Action dated Oct. 29, 2009, 18 pages.

U.S. Appl. No. 11/680,559, Final Office Action dated Mar. 18, 2010, 19 pages.

U.S. Appl. No. 11/680,559, Advisory Action dated May 19, 2010, 3 pages.

U.S. Appl. No. 11/680,559, Non-Final Office Action dated Jun. 23, 2010, 19 pages.

U.S. Appl. No. 11/680,559, Final Office Action dated Nov. 22, 2010, 23 pages.

U.S. Appl. No. 11/680,571, Non-Final Office Action dated Aug. 11, 2010, 11 pages.

U.S. Appl. No. 11/680,571, Final Office Action dated Nov. 24, 2010, 10 pages.

U.S. Appl. No. 11/680,548, Non-Final Office Action dated Apr. 6, 2009, 13 pages.

U.S. Appl. No. 11/680,548, Final Office Action date Oct. 13, 2009, 10 pages.

U.S. Appl. No. 11/680,548, Advisory Action dated Jan. 4, 2010, 3 pages.

U.S. Appl. No. 11/680,548, Non-Final Office Action dated Mar. 15, 2010, 11 pages.

U.S. Appl. No. 11/680,548, Final Office Action dated Aug. 25, 2010 12 pages.

U.S. Appl. No. 11/680,570, Non-Final Office Action dated Apr. 24, 2009 17 pages.

U.S. Appl. No. 11/680,570, Final Office Action dated Oct. 9, 2009, 13 pages.

U.S. Appl. No. 11/680,570, Advisory Action dated Dec. 17, 2009, 3 pages.

U.S. Appl. No. 11/680,570, Non-Final Office Action dated May 14, 2010, 11 pages.

U.S. Appl. No. 11/680,570, Final Office Action dated Sep. 21, 2010, 12 pages.

U.S. Appl. No. 11/680,570, Advisory Action dated Nov. 8, 2010, 3 pages.

U.S. Appl. No. 11/680,544, Non-Final Office Action dated Mar. 16, 2010, 29 pages.

U.S. Appl. No. 11/680,544, Final Office Action dated Jul. 19, 2010, 39 pages.

U.S. Appl. No. 11/680,556, Non-Final Office Action dated Feb. 25, 2009, 7 pages.

U.S. Appl. No. 11/680,556, Final Office Action dated Jul. 9, 2009, 11 pages.

U.S. Appl. No. 11/680,556, Advisory Action dated Sep. 23, 2009, 3 pages.

U.S. Appl. No. 11/680,556, Non-Final Office Action dated Jan. 19, 2010, 11 pages.

U.S. Appl. No. 11/680,556, Non-Final Office Action dated Jul. 9, 2010, 12 pages.

U.S. Appl. No. 11/680,556, Final Office Action dated Dec. 22, 2010, 16 pages.

U.S. Appl. No. 11/680,510, Non-Final Office Action dated Apr. 2, 2009, 15 pages.
U.S. Appl. No. 11/680,510, Final Office Action dated Sep. 18, 2009, 10 pages.
U.S. Appl. No. 11/680,510, Advisory Action dated Dec. 1, 2009, 3 pages.
U.S. Appl. No. 11/680,510, Non-Final Office Action dated Jan. 12, 2010, 10 pages.
U.S. Appl. No. 11/680,510, Final Office Action dated Jun. 21, 2010, 13 pages.
U.S. Appl. No. 11/680,510, Advisory Action dated Aug. 18, 2010, 3 pages.
U.S. Appl. No. 11/769,245, Non-Final Office Action dated Mar. 5, 2010, 9 pages.
U.S. Appl. No. 11/769,245, Final Office Action dated Jul. 12, 2010, 10 pages.
U.S. Appl. No. 11/769,245, Advisory Action dated Sep. 13, 2010, 3 pages.
U.S. Appl. No. 11/769,245, Non-Final Office Action dated Nov. 23, 2010, 10 pages.
Lee et al, "An Enterprise Intelligence System Integrating WWW and Intranet Resource," In: Research Issues on Data Engineering: Information Technology for Virtual Enterprises, 1999. RIDE-VE '99. Proceedings, Ninth International Workshop on (1999). Available at: IEEE Xplore, 8 pages.
U.S. Appl. No. 11/680,530, Final Office Action dated Oct. 28, 2011, 31 pages.
U.S. Appl. No. 11/680,544 , Final Office Action dated Oct. 27, 2011, 51 pages.
U.S. Appl. No. 11/680,545, Final Office Action dated Oct. 26, 2011, 34 pages.
U.S. Appl. No. 11/680,548, Non-Final Office Action dated Aug. 24, 2011, 11 pages.
U.S. Appl. No. 11/680,556, Notice of Allowance dated Nov. 17, 2011, 8 pages.
U.S. Appl. No. 11/680,558, Non-Final Office Action dated Sep. 12, 2011, 12 pages.
U.S. Appl. No. 11/680,559, Advisory Action dated Nov. 14, 2011, 3 pages.
U.S. Appl. No. 11/680,559, Final Office Action dated Aug. 29, 2011, 25 pages.
U.S. Appl. No. 11/680,571, Advisory Action dated Sep. 21, 2011, 3 pages.
U.S. Appl. No. 11/680,571, Non-Final Office Action dated Dec. 5, 2011, 9 pages.
U.S. Appl. No. 11/680,510, Notice of Allowance mailed Apr. 14, 2011, 8 pages.
U.S. Appl. No. 11/680,530, Non-Final Office Action dated Jul. 6, 2011, 28 pages.
U.S. Appl. No. 11/680,544, Non-Final Office Action dated Jul. 7, 2011, 38 pages.
U.S. Appl. No. 11/680,545, Non-Final Office Action dated Jul. 7, 2011, 29 pages.
U.S. Appl. No. 11/680,548, Advisory Action dated Jun. 16, 2011 2 pages.
U.S. Appl. No. 11/680,548, Final Office Action date Apr. 13, 2011, 12 pages.
U.S. Appl. No. 11/680,556, Non-Final Office Action dated Jul. 6, 2011, 17 pages.
U.S. Appl. No. 11/680,558, Non-Final Office Action dated Apr. 26, 2011, 10 pages.
U.S. Appl. No. 11/680,559, Advisory Action dated Jan. 28, 2011, 3 pages.
U.S. Appl. No. 11/680,559, Non-Final Office Action dated Mar. 24, 2011, 25 pages.
U.S. Appl. No. 11/680,570, in Notice of Allowance mailed Jun. 8, 2011, 9 pages.
U.S. Appl. No. 11/680,571, Advisory Action dated Jan. 27, 2011, 2 pages.
U.S. Appl. No. 11/680,571, Non-Final Office Action dated Mar. 28, 2011, 9 pages.
U.S. Appl. No. 11/680,571, Final Office Action dated Jul. 13, 2011, 11 pages.
U.S. Appl. No. 11/769,245, Notice of Allowance mailed May 23, 2011, 8 pages.
U.S. Appl. No. 12/751,268, Notice of Allowance dated Feb. 22, 2011, 9 pages.
Non-Final Office Action for U.S. Appl. No. 13/110,461 mailed on Dec. 13, 2011, 6 pages.
Non-Final Office Action for U.S. Appl. No. 13/079,434 mailed on Dec. 28, 2011, 8 pages.
Advisory Action for U.S. Appl. No. 11/680,544 mailed on Jan. 13, 2012, 3 pages.
Notice of Allowance for U.S. Appl. No. 11/680,559 mailed Mar. 6, 2012, 8 pages.
Final Office Action for U.S. Appl. No. 11/680,548 mailed Mar. 21, 2012, 11 pages.
Final Office Action for U.S. Appl. No. 11/680,571 mailed Mar. 29, 2012, 12 pages.
Notice of Allowance for U.S. Appl. No. 13/110,461 mailed Apr. 3, 2012, 5 pages.
Advisory Action for U.S. Appl. No. 11/680,548 mailed May 25, 2012, 3 pages.
Non-Final Office Action for U.S. Appl. No. 13/169,688 mailed on Jun. 21, 2012, 12 pages.
Non-Final Office Action for U.S. Appl. No. 11/649,098 mailed on Jul. 23, 2012, 15 pages.
Notice of Allowance for U.S. Patent Application No. 11/680,571 mailed on Aug. 15, 2012, 12 pages.

* cited by examiner

AUTOMATICALLY FINDING ACRONYMS AND SYNONYMS IN A CORPUS

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

Embodiments in accordance with the present invention relate generally to electronic searching of documents and data, and more particularly relate to automatically determining acronym and synonym pairs useful for obtaining more accurate query results.

An end user in an enterprise or web environment frequently searches huge databases. For example, Internet search engines are frequently used to search the entire world wide web. Information retrieval systems are traditionally judged by their precision and recall. Large databases of documents, especially the World Wide Web, contain many low quality documents where the relevance to the desired search term is extremely low or non-existent. As a result, searches typically return hundreds of irrelevant or unwanted documents which camouflage the few relevant ones that meet the personalized needs of an end user. In order to improve the selectivity of the results, common techniques allow an end user to modify the search, or to provide different or additional search terms. These techniques are most effective in cases where the database being searched is homogeneous or structured and already classified into subsets, or in cases where the user is searching for well known and specific information. In other cases, however, these techniques are often not effective.

When attempting to locate information such as electronic documents, it is common for a user to enter search terms into a search engine interface, whereby the engine can utilize those terms to search for documents that have matching keywords, text, titles, etc. One problem with such an approach is that there might be multiple ways to express a given term, such that a relevant document might not match a given term. For example, a user searching for the term "real application clusters" might search by a common industry term such as "RAC," which would result in finding only documents that use that particular acronym and not documents that use the full term "real application clusters". Given a corpus of documents, then, it can be desirable to utilize acronyms and synonym pairs to build a thesaurus, whereby relationships between terms can be used by applications such as text mining applications, search engines, etc.

In enterprise searching, for example, different system deployments or different corpora may define the same terms differently, thus making it difficult to return a customized listing of hits to an end user. Providing a simple and intuitive way to allow customers to improve search results in heterogeneous enterprise environments is critical to improve user flexibility and personalization. One way to improve search results in such an environment is to define and maintain a list of acronym and synonym pairs from disparate sources of data. However, this task is complicated where the context of a term may be different in heterogeneous applications, and where there many be numerous such terms. A customized thesaurus could be manually built for a given corpus of focus, but such efforts would be time consuming and expensive.

Therefore it is desirable to provide a simple, intuitive, and heuristic method to allow an end user to automatically define and find acronym and synonym pairs to meet global or single instance requirements in a heterogeneous enterprise environment query.

BRIEF SUMMARY OF THE INVENTION

Systems and methods in accordance with various embodiments of the present invention provide for the automatic identification of synonym and acronym pairs, such as by using specified heuristic patterns. Such an approach can automatically keep an updated list of such pairs that can be useful in generating more accurate search results, such as across an enterprise.

In one embodiment, each sentence in a selected target corpus is examined to identify possible acronym and synonym pairs. An occurrence frequency of each identified possible acronym and synonym pair is determined, as well as a maximum possible length. Each identified possible acronym and synonym pair then is ranked based on a combination of the occurrence frequency and maximum possible length. This combination can be weighted or otherwise defined by the user. The ranked acronym and synonym pairs, or at least those having above a minimum ranking, can be to the user and/or saved for use in future searches.

In one embodiment a ranking of the identified possible acronym and synonym pairs first occurs after determining the occurrence frequency, whereby a maximum possible length is determined only for those identified possible acronym and synonym pairs exceeding a specified ranking based on the occurrence frequency. A user also can specify a minimum occurrence frequency value and/or a maximum term length value whereby possible acronym and synonym pairs are ranked.

In one embodiment, the identified possible acronym and synonym pairs are ranked using a process whereby pairs with a longer maximum length are ranked higher than terms with a shorter maximum length when those pairs have substantially the same occurrence frequency, or above a minimum occurrence frequency. A shallow pause can be implemented for each sentence when each sentence is analyzed, and a user can select a target corpus that is a subset of a domain or that spans multiple domains.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DETAILED DESCRIPTION

Figure 1:
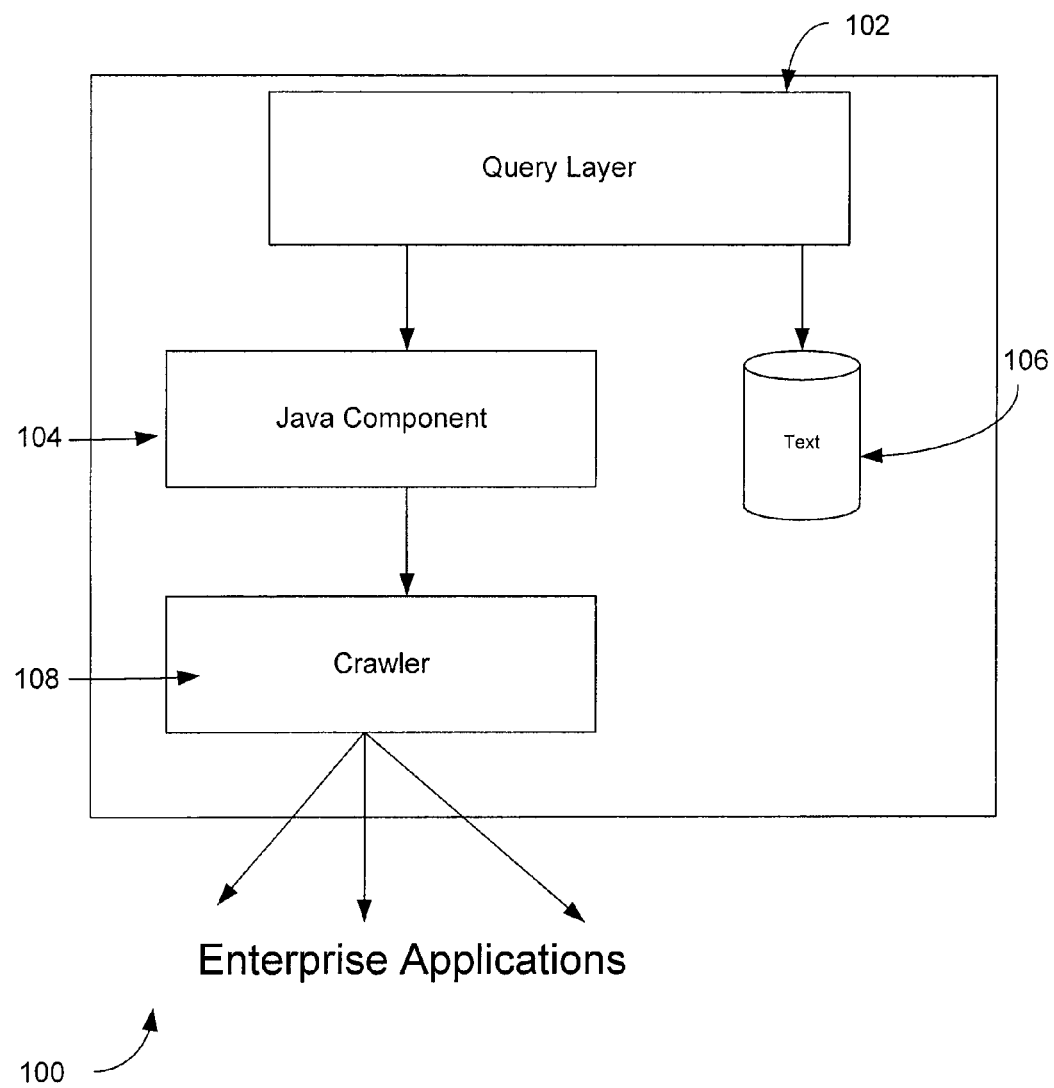
FIG. 1 illustrates a system for automatically finding acronyms and synonyms in a corpus, utilizing the text index of a database and a query layer.

Systems and methods in accordance with various embodiments of the present invention overcome the aforementioned and other deficiencies in existing search and data retrieval systems by providing for the automatic identification and maintenance of acronym and synonym pairs. The automatic identification and retrieval can be based on a customer setting globally or in a single instance of a heterogeneous enterprise or web environment, utilizing heuristic patterns in a sentence. In one embodiment, the a search system utilizes the text index of a database resulting from a crawl operation to accept documents and generate lists for searching. FIG. 1 illustrates an exemplary secure enterprise search (SES) system implementation 100, wherein an SES server includes a query layer operable to work through a Java component 104 to direct a crawler 108 to crawl various enterprise applications, documents, and objects, and then store a data index in a local or remote database 106. An application programming interface (API) or client interface allows a user to submit queries, such as text queries, to search documents or data objects based on terms or keywords, for example.

Automatically finding acronym and synonym pairs in a corpus comprises an overall process that initially defines acronym and synonym term pairs in the form of a domain-specific heuristic user-defined rule. Heuristic patterns demonstrate certain relationships between two different terms. Upon defining the rules in which the terms will be compared, a selected corpus is crawled, indexed, and read. Based upon the definitions of the user-created heuristic domain relationships, a rule interpreter engine can execute a user defined rule set to properly identify and retrieve acronym and synonym pairs through the utilization of a shallow pause-read step. Finally, the user selected acronym and synonym pairs can be ranked and displayed.

According to one aspect of the present invention, two quantities are used to rank acronym and synonym candidate pairs. A first quantity is an occurrence frequency gathered from the corpus. All sentences in the corpus are evaluated to find all possible acronym and synonym pairs bases on specified heuristic patterns. Each pair is associated with a number denoting its frequency of occurrence. Based on this occurrence frequency, certain possible matches will be removed due to a low level of occurrence, and certain matches can be highly ranked based upon a high level of occurrence.

A second quantity is a maximum possible length. The longer the term, the higher the pair will be ranked in the overall results. For example, if there are acronym pair possibilities for "clusters" and "RAC", as well as "real application clusters" and "RAC", then if they have the same occurrence frequency the term "real application clusters", which has a longer maximum possible length, will be more highly overall ranked for "RAC" than will just the term "clusters". The ranking score then can be a combination of the occurrence frequency and the overall length. There also can be a setting of minimum occurrence and/or maximum length, whereby false results can be avoided.

In such an approach, a ranking score is defined and calculated for each term and query results pair, providing a maximum possible length ranking score and an occurrence frequency ranking score for each term and query result pair. A plurality of combinations or selection methods create a rule set or heuristic for an end user depending on the relative weighting of the above quantities.

In one embodiment, all sentences in a corpus are analyzed to find all possible acronym and synonym pairs based on specified heuristic domain acronym or synonym patterns using the occurrence frequency approach. Each identified and retrieved pair is associated with a number denoting its frequency of occurrence. The ranked pairs are retrieved based on a user defined rule to determine the order of the listed retrieved candidate pairs. Based on occurrence frequency, for example, the pair "Oracle Real Application Clusters" and "RAC" will be removed, or at least lowered in ranking, if it occurs less frequently than another pair such as "Real Application Cluster" and "RAC". In another application of occurrence frequency, all possible pairs are ranked using the user defined heuristic acronym or synonym pair rule.

In one embodiment, only the higher ranked term from each candidate pair will be used, based on maximum length for the same occurrence frequency. Alternatively, for the same maximum length only the one with the higher occurrence frequency may be used. A user defined rule may be applied to rank the listing of longer length terms, etc.

According to another embodiment, search users may focus their search to a specific source or corpus in an integrated heterogeneous enterprise search system. The acronyms and synonyms detected from the focused sources should be suggested, instead of simply using acronyms and synonyms from other sources. Extracting acronym and synonym pairs based on one specific corpus can find acronym and synonym pairs specific to the corpus. For example, "RAC" might correspond to "Rent A Center" more often in the overall enterprise, but may not occur at all, and may be wholly inappropriate, for a particular corpus wherein "RAC" corresponds to "Real Application Cluster".

An end user may also decide to focus search suggestions on acronyms and synonyms from other sources as well where it is desired to search external with respect to a particular focused source.

The acronym and synonym candidate pair ranking heuristic specification can be set by customers to be effective for the whole search system, or the acronym and synonym ranking candidate pairs heuristic specification can be submitted with each query and then impact acronym and synonym ranking heuristic differently for each query.

Figure 2:
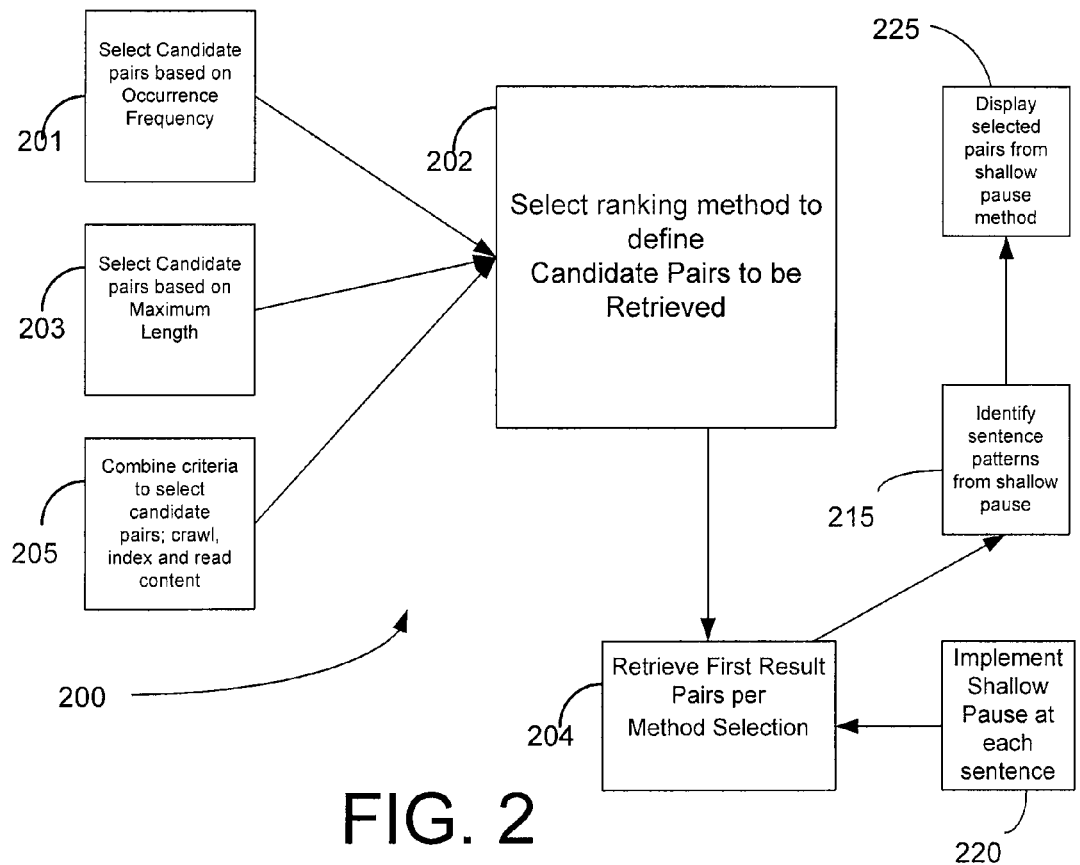
FIG. 2 illustrates an overall process of defining acronym and synonym candidate term pair rule to crawl and read a selected corpus.

FIG. 2 illustrates an exemplary method 200 for providing automatic identification and retrieval of acronym and synonym pairs in a corpus. In such an approach, the user or administrator can select a ranking method to be used in defining candidate pairs to be retrieved 202. The user may be able to select candidate pairs based on occurrence frequency 201, based on maximum length 203, or a combination thereof 205. After the methods have been selected, the system can search the documents to retrieve possible result pairs using the selected methods 204. A shallow pause can be implemented at each sentence 220, whereby sentence patterns can be identified 215. Heuristic patterns in each sentence can be utilized to identify and retrieve the acronym and synonym pairs. Heuristic patterns demonstrate certain relationships between two different terms. In a heterogeneous enterprise environment, different domains may have differing acronym or synonym pairs defined for search recall. To identify and retrieve the desired pairs, a search system determines the appropriate pairs from a set of candidate pairs utilizing defined heuristic patterns based on at least one or a combination of rules. A 'shallow' pause is utilized to select pairs in this embodiment to identify sentence patterns, unlike a machine learning deep pause wherein a document sentence is parsed as in an artificial intelligence application. The automatic identification and retrieval of acronym and synonym pairs in a corpus uses a shallow pause because the method examines a sentence for usage and occurrence relationships. The selected pairs are then ranked and displayed 225.

Figure 3:
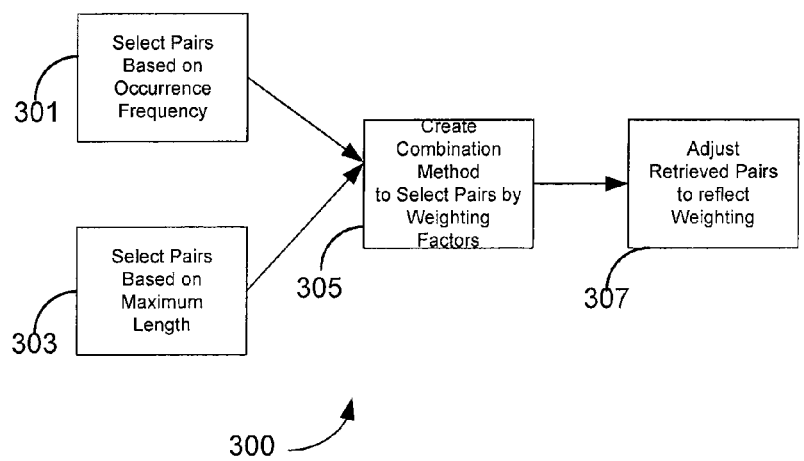
FIG. 3 illustrates two methods of ranking candidate pairs using an occurrence frequency method and a maximum length term method.

FIG. 3 illustrates a slightly different approach 300, wherein a system selects possible pairs based on occurrence frequency 301 and maximum length 303, then creates a combination method to select pairs using a weighting factor 305. The retrieved pairs then can have a ranking adjusted accordingly to reflect the weighting 307. For example, a user may combine the ranking methods with a plurality of weightings when there is a need to rank all possible candidate pairs in a corpus but yet also a need to rank the longest term from each candidate pair higher. To illustrate, if the maximum length ranking method is more important than occurrence frequency, a combination ranking method is defined whose value may be computed where the maximum length ranking is weighted more heavily than the occurrence frequency methods. As a result, the retrieved search terms may be adjusted accordingly to the combined ranking method to achieve varied results as required in a particular application.

Figure 4:
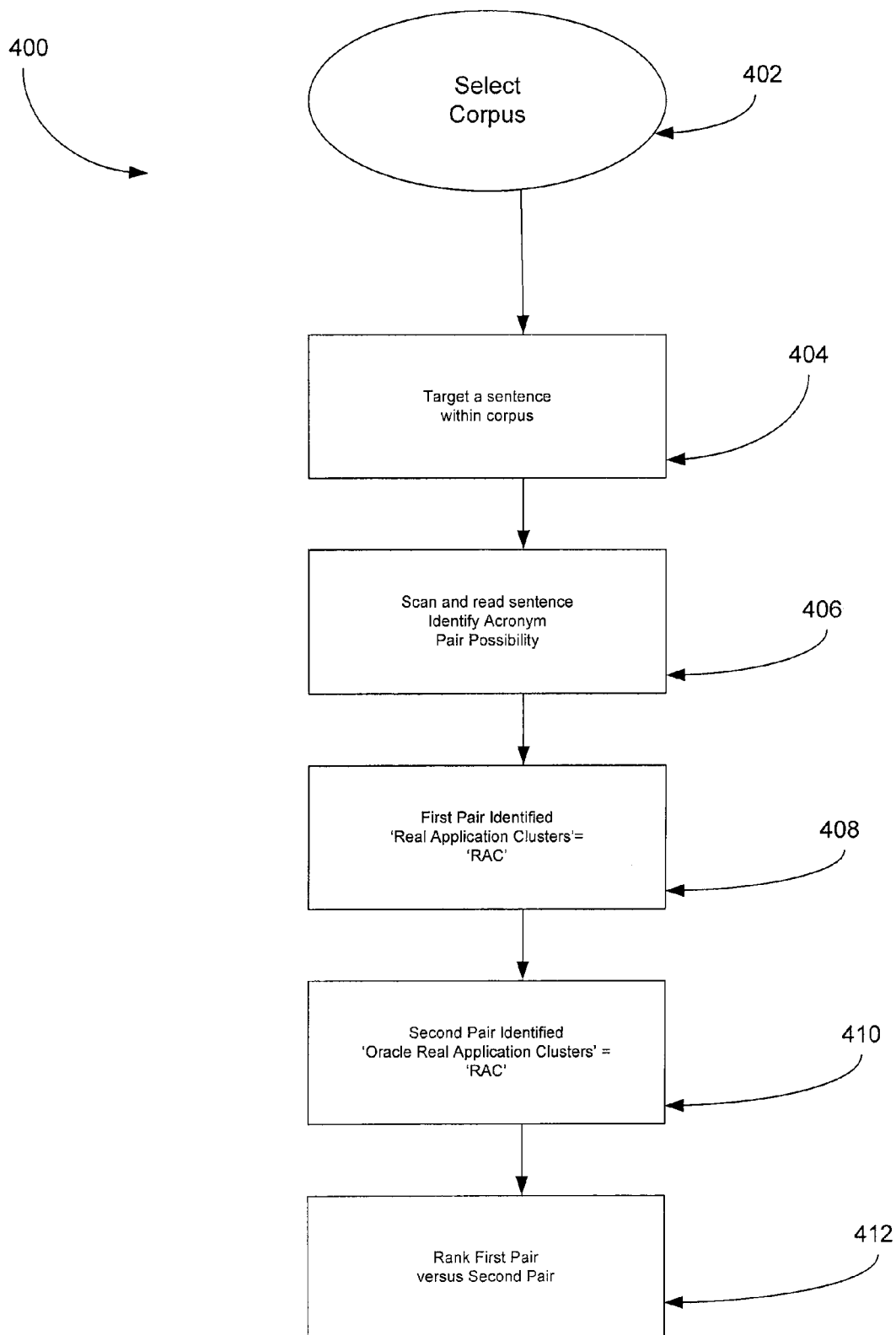
FIG. 4 illustrates a shallow pause method of ranking acronym and synonym candidate pairs.

FIG. 4 illustrates steps of a process 400 in accordance with another embodiment. In this process, a corpus to be searched is first selected 402. Within the defined corpus, each sentence is targeted 404. The targeted sentence is scanned and read to identify any acronym or synonym pair possibility 406. The process might identify a first possible pair 408 and a second possible pair 410. In such a case, the method utilizes a weighting or other approach discussed or suggested herein to rank the first pair relative to the second possible pair 412. The lower ranked pair may then be discarded in certain embodiments.

Figure 5:
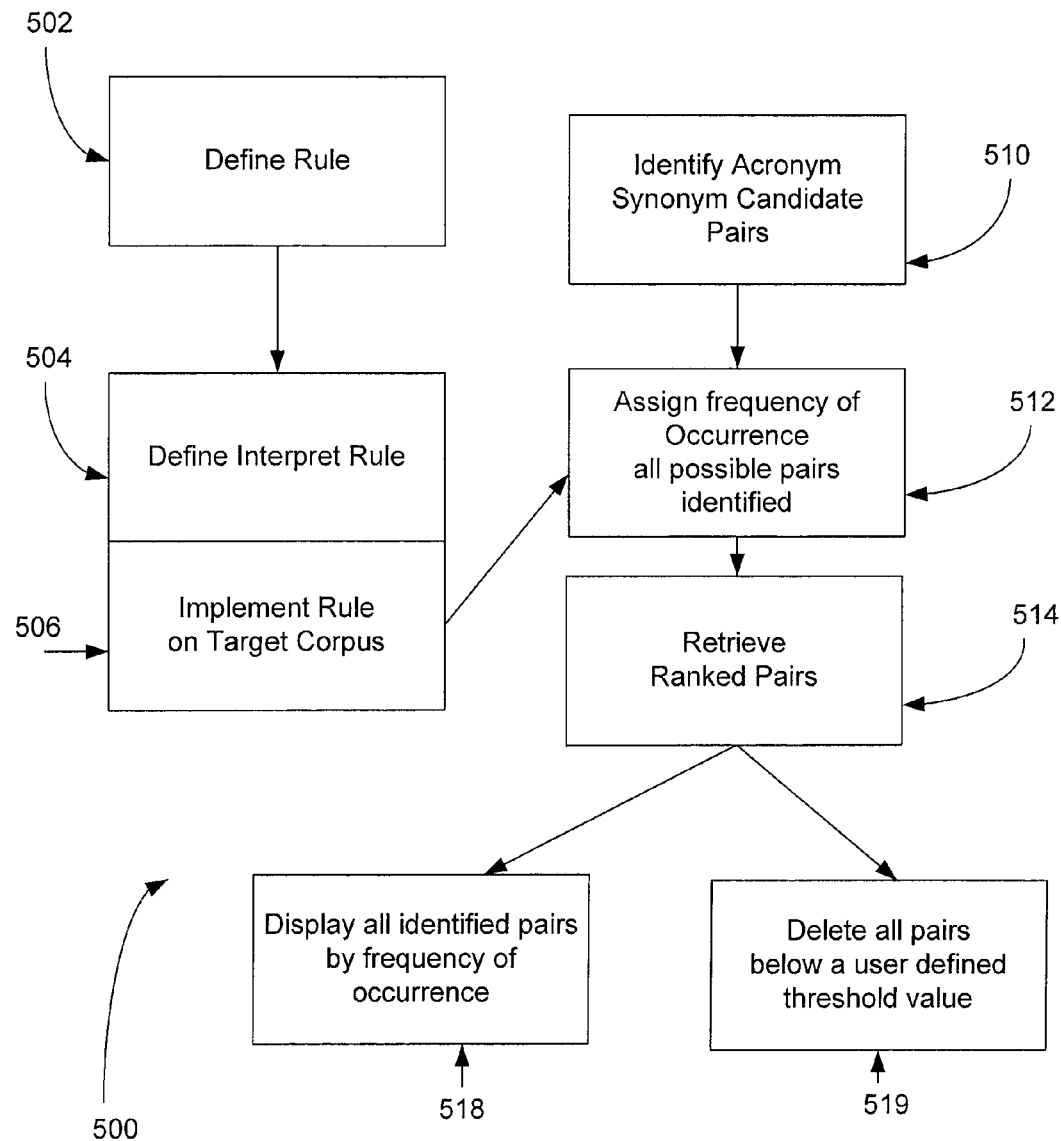
FIG. 5 illustrates the occurrence frequency method of ranking candidate acronym and synonym pairs.

FIG. 5 illustrates steps of another exemplary process 500 for ranking candidate pairs using occurrence frequency gathered from the corpus. In this process, an occurrence frequency rule is defined 502, as well as a rule for interpreting the frequency 504, which then are implemented on the target corpus 506. Possible acronym and synonym pairs then are identified for the corpus 510, and a frequency of occurrence is assigned for all possible pairs using the occurrence frequency rule 512. The ranked pairs are then retrieved 514, with the identified ranked pairs meeting the interpretation rules being displayed 518, or held for further analysis, and all other pairs being discarded 519.

Figure 6:
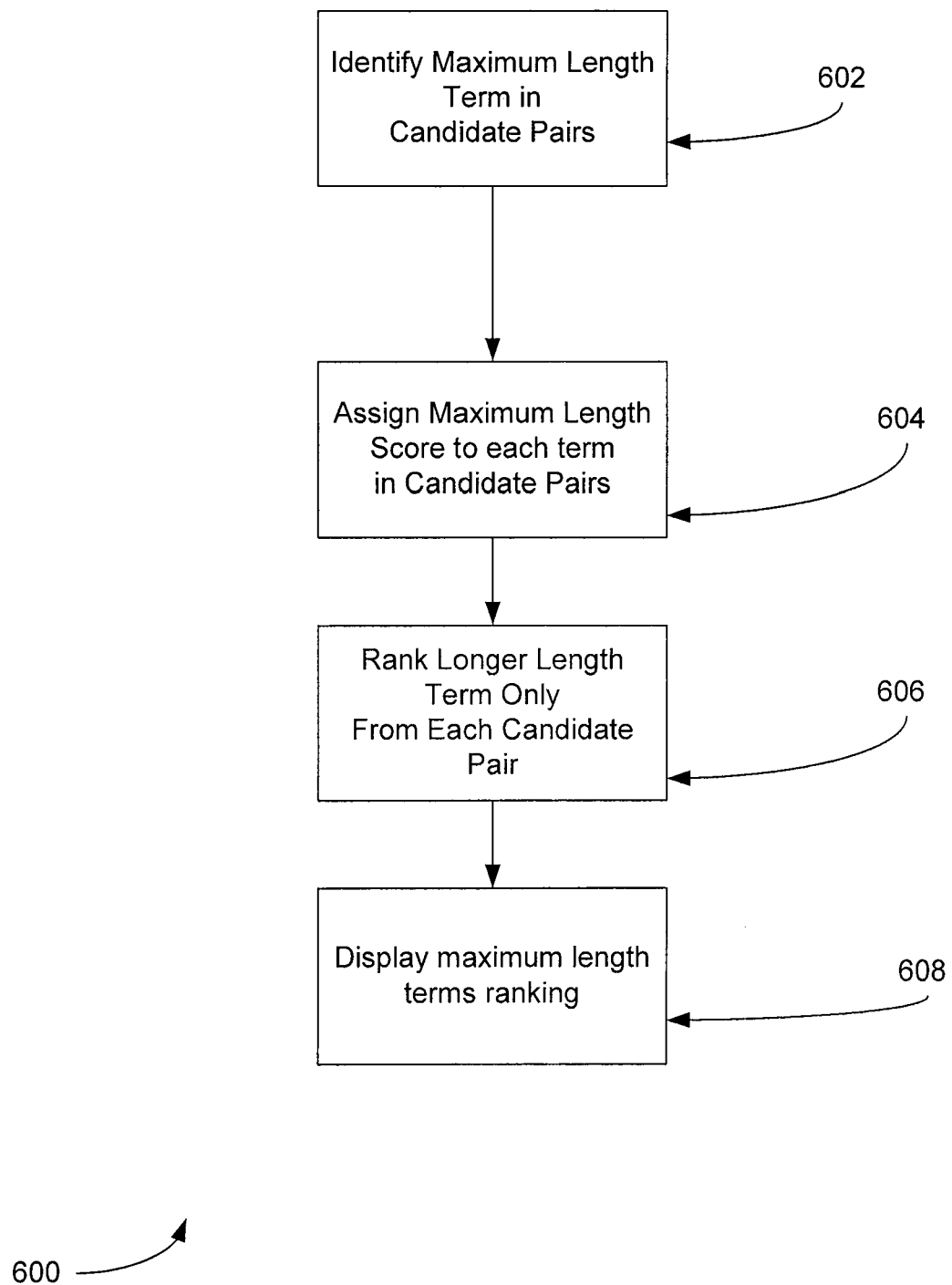
FIG. 6 further illustrates a further aspect of the invention defined as a maximum possible length method to rank candidate pairs.

FIG. 6 illustrates steps of a method 600 for using the maximum possible length to rank candidate pairs. In this process, maximum length term pairs 602 are identified in the candidate pairs, such as those identified and held from the process of FIG. 5. A maximum length score then can be assigned to each such candidate pair 604, with longer terms being more highly ranked or even being the only pair ranked 606. For example, between 'clusters' and "RAC", and the pair "Real Application Clusters" and "RAC" if these pairs have the same occurrence frequency, the term 'Real Application Clusters' will be ranked with "RAC" due to the longer length. The maximum length terms that remain 608 and/or are more highly ranked then can be displayed and/or used for subsequent searches.

Figure 7:
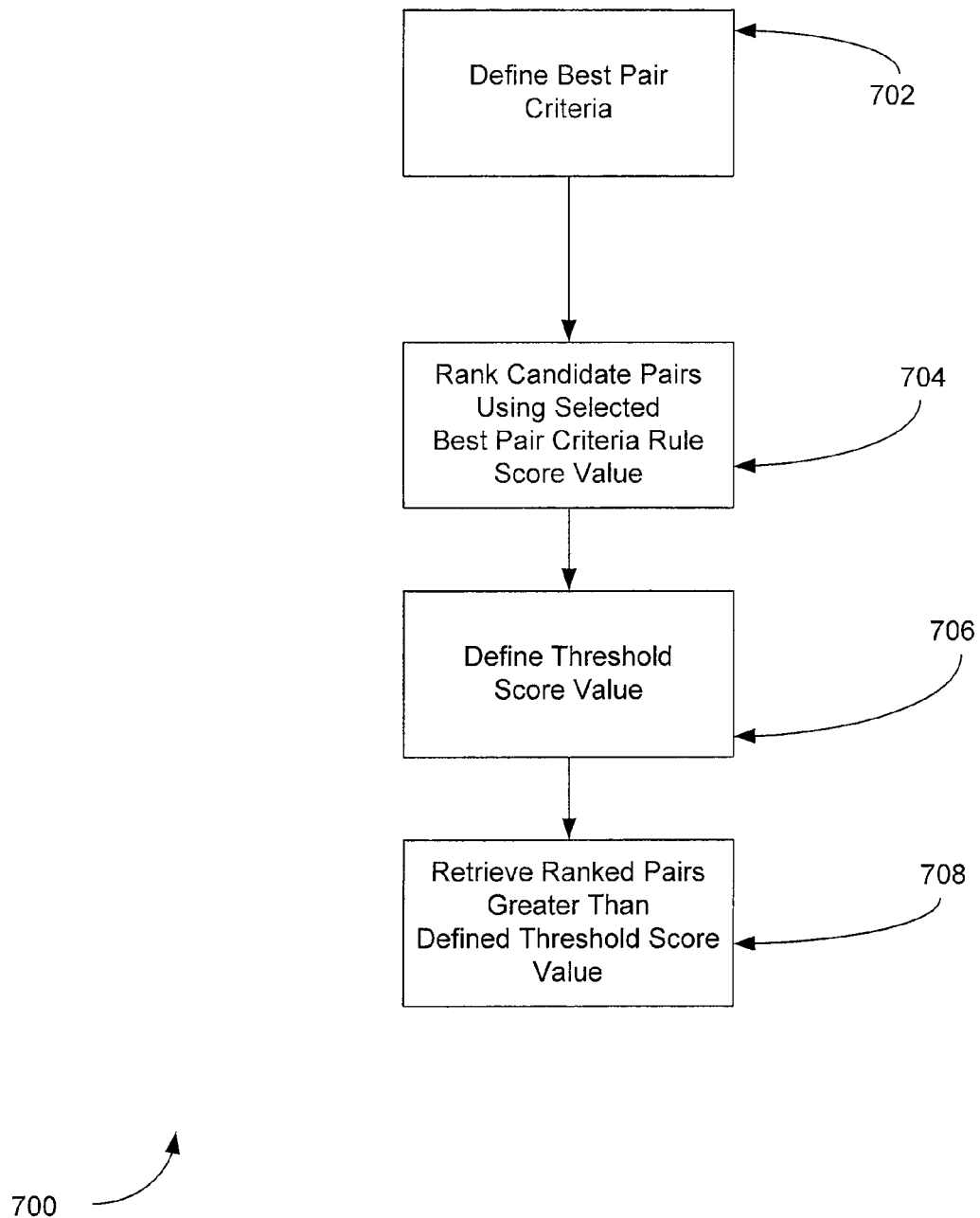
FIG. 7 further illustrates best pair criteria and threshold rank score values.

FIG. 7 illustrates steps of a method 700 wherein, after the candidate pairs are ranked, an end user can select the best pair which contains the query word, or can select multiple pairs that contain the query word and have rank scores higher than a defined threshold value. Here, the user defines the best pair criteria 702 when then can be used to rank candidate pairs accordingly 704. A threshold score value can be defined 706, after which ranked pairs with a value at or greater than a defined threshold score value are retrieved 708. In another configuration of the system, acronym or synonym pairs may be ranked using one selected or a combination of the user defined rules to retrieve acronym or synonym pair results 704.

Figure 8:
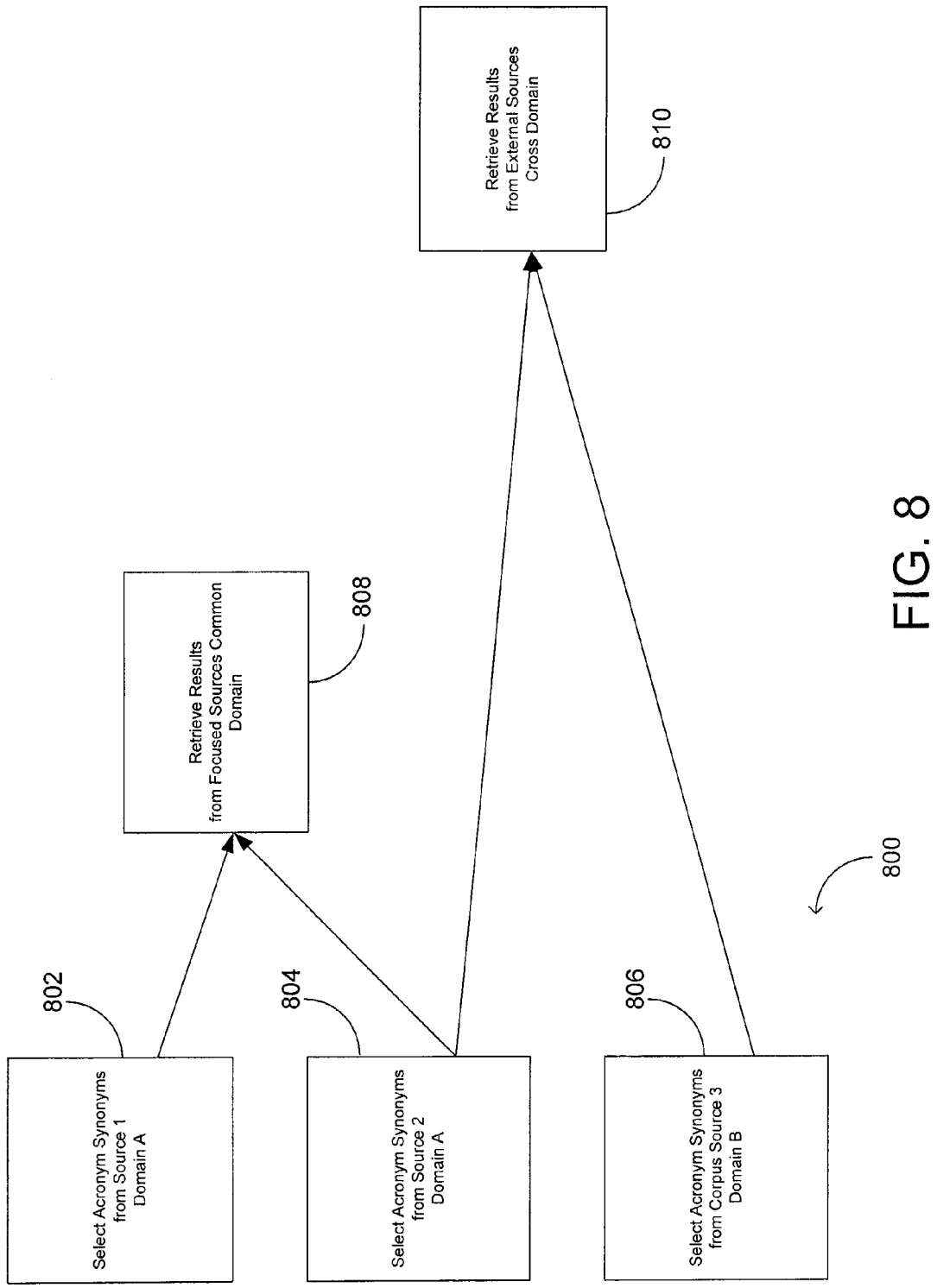
FIG. 8 illustrates the differences between a focused domain corpus search and extracting acronym and synonym pairs from external cross domain corpus source.

FIG. 8 illustrates another portion of an exemplary process 800 wherein search users are able to focus their search to a specific source or corpus. The acronyms and synonyms detected from the focused sources then are to be suggested instead of acronyms and synonyms from other sources. Extracting acronym and synonym pairs based on one specific corpus can find acronym and synonym pairs specific to the corpus. The search user also may choose to retrieve results external to the corpus. As shown, possible acronym pairs can be selected or retrieved from sources 1 and 2 across domain A based upon user preference 802, 804. There may also be possible acronym pairs selectable from source 3 in domain B 806. A user may then select to retrieve results from focused sources in the domain 808, or can select to also retrieve results from outside the domain 810.

Exemplary Operating Environments, Components, and Technology

Figure 9:
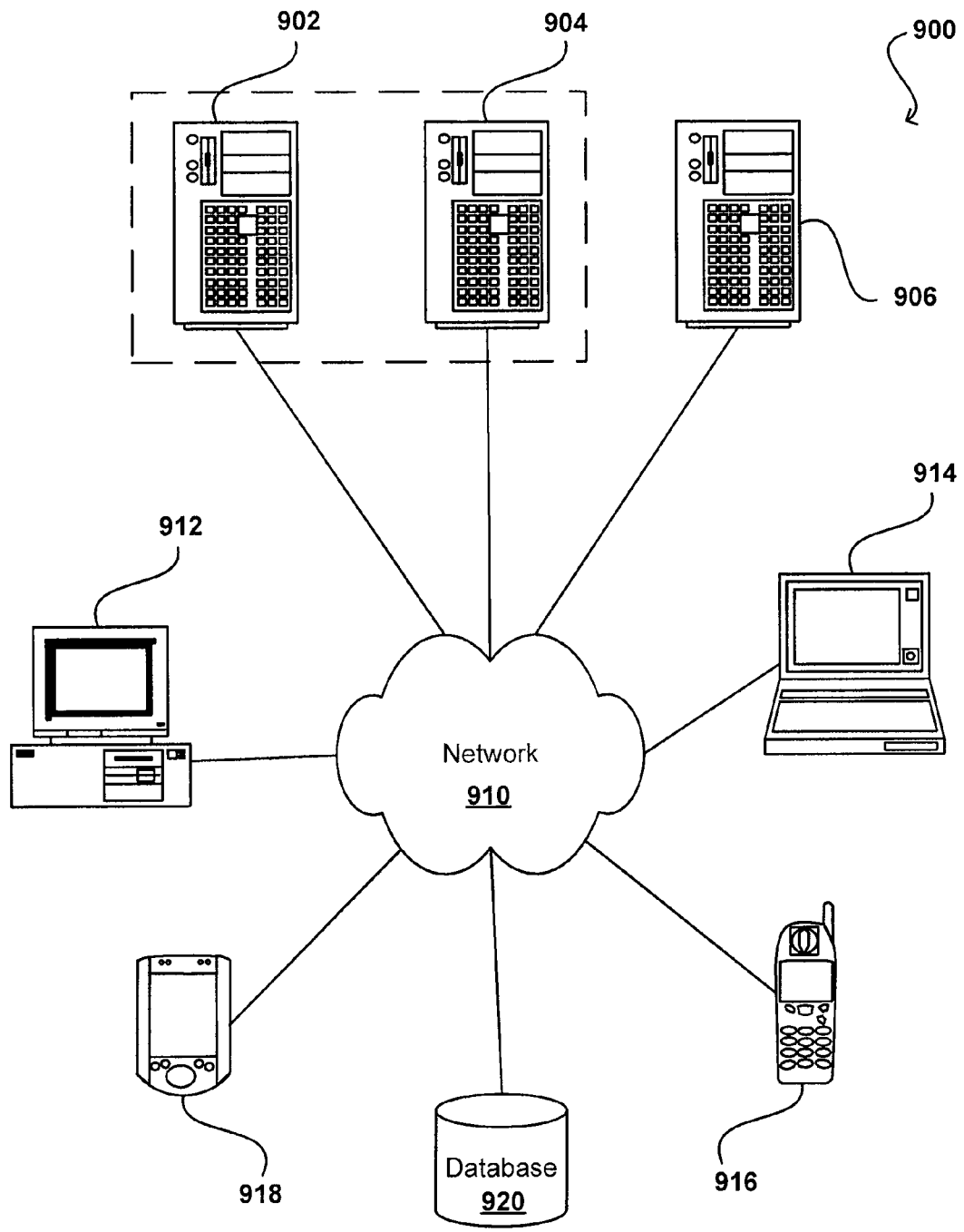
FIG. 9 illustrates components of a computer network that can be used in accordance with one embodiment of the present invention.

FIG. 9 is a block diagram illustrating components of an exemplary operating environment in which embodiments of the present invention may be implemented. The system 900 can include one or more user computers, computing devices, or processing devices 912, 914, 916, 918, which can be used to operate a client, such as a dedicated application, web browser, etc. The user computers 912, 914, 916, 918 can be general purpose personal computers (including, merely by way of example, personal computers and/or laptop computers running a standard operating system), cell phones or PDAs (running mobile software and being Internet, e-mail, SMS, Blackberry, or other communication protocol enabled), and/or workstation computers running any of a variety of commercially-available UNIX or LNIX-like operating systems (including without limitation, the variety of GNU/Linux operating systems). These user computers 912, 914, 916, 918 may also have any of a variety of applications, including one or more development systems, database client and/or server applications, and Web browser applications. Alternatively, the user computers 912, 914, 916, 918 may be any other electronic device, such as a thin-client computer, Internet-enabled gaming system, and/or personal messaging device, capable of communicating via a network (e.g., the network 910 described below) and/or displaying and navigating Web pages or other types of electronic documents. Although the exemplary system 900 is shown with four user computers, any number of user computers may be supported.

In most embodiments, the system 900 includes some type of network 910. The network can be any type of network familiar to those skilled in the art that can support data communications using any of a variety of commercially-available protocols, including without limitation TCP/IP, SNA, IPX, AppleTalk, and the like. Merely by way of example, the network 910 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, GRPS, GSM, UMTS, EDGE, 2G, 2.5G, 3G, 4G, Wimax, WiFi, CDMA 2000, WCDMA, the Bluetooth protocol known in the art, and/or any other wireless protocol); and/or any combination of these and/or other networks.

The system may also include one or more server computers 902, 904, 906 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 906) may be dedicated to running applications, such as a business application, a Web server, application server, etc. Such servers may be used to process requests from user computers 912, 914, 916, 918. The applications can also include any number of applications for controlling access to resources of the servers 902, 904, 906.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 912, 914, 916, 918. As one example, a server may execute one or more Web applications. The Web application may be implemented as one or more scripts or programs written in any programming language, such as Java®, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 912, 914, 916, 918.

The system 900 may also include one or more databases 920. The database(s) 920 may reside in a variety of locations. By way of example, a database 920 may reside on a storage medium local to (and/or resident in) one or more of the computers 902, 904, 906, 912, 914, 916, 918. Alternatively, it may be remote from any or all of the computers 902, 904, 906, 912, 914, 916, 918, and/or in communication (e.g., via the network 910) with one or more of these. In a particular set of embodiments, the database 920 may reside in a storage-area network ("SAN") familiar to those skilled in the art. Similarly, any necessary files for performing the functions attributed to the computers 902, 904, 906, 912, 914, 916, 918 may be stored locally on the respective computer and/or remotely, as appropriate. In one set of embodiments, the database 920 may be a relational database, such as Oracle 10g, that is adapted to store, update, and retrieve data in response to SQL-formatted commands.

Figure 10:
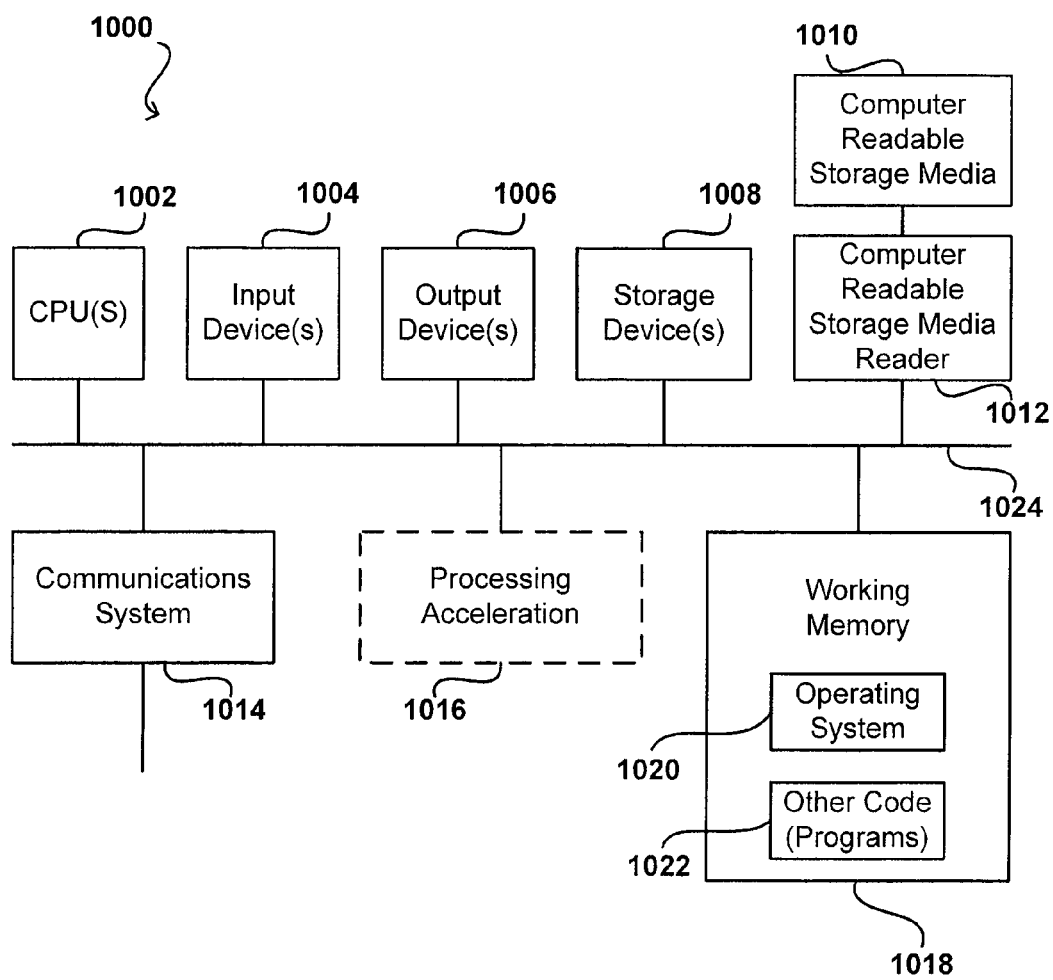
FIG. 10 illustrates components of a computerized device that can be used in accordance with one embodiment of the present invention.

FIG. 10 illustrates an exemplary computer system 1000, in which embodiments of the present invention may be implemented. The system 1000 may be used to implement any of the computer systems described above. The computer system 1000 is shown comprising hardware elements that may be electrically coupled via a bus 1024. The hardware elements may include one or more central processing units (CPUs) 1002, one or more input devices 1004 (e.g., a mouse, a keyboard, etc.), and one or more output devices 1006 (e.g., a display device, a printer, etc.). The computer system 1000 may also include one or more storage devices 1008. By way of example, the storage device(s) 1008 can include devices such as disk drives, optical storage devices, solid-state storage device such as a random access memory ("RAM") and/or a read-only memory ("ROM"), which can be programmable, flash-updateable and/or the like.

The computer system 1000 may additionally include a computer-readable storage media reader 1012, a communications system 1014 (e.g., a modem, a network card (wireless or wired), an infra-red communication device, etc.), and working memory 1018, which may include RAM and ROM devices as described above. In some embodiments, the computer system 1000 may also include a processing acceleration unit 1016, which can include a digital signal processor DSP, a special-purpose processor, and/or the like.

The computer-readable storage media reader 1012 can further be connected to a computer-readable storage medium 1010, together (and, optionally, in combination with storage device(s) 1008) comprehensively representing remote, local, fixed, and/or removable storage devices plus storage media for temporarily and/or more permanently containing, storing, transmitting, and retrieving computer-readable information. The communications system 1014 may permit data to be exchanged with the network and/or any other computer described above with respect to the system 1000.

The computer system 1000 may also comprise software elements, shown as being currently located within a working memory 1018, including an operating system 1020 and/or other code 1022, such as an application program (which may be a client application, Web browser, mid-tier application, RDBMS, etc.). It should be appreciated that alternate embodiments of a computer system 1000 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method in a computer system for identifying acronym and synonym pairs for a selected target corpus, the method comprising:
    analyzing each sentence in a target corpus to identify possible acronym and synonym pairs;
    determining, using a processor associated with a computer system, an occurrence frequency of each identified possible acronym and synonym pair from among a plurality of possible acronym and synonym pairs;
    determining a maximum possible length for each identified possible acronym and synonym pair;
    receiving a user-selected relative weighting factor from a user for weighting an occurrence frequency relative to a maximum possible length;
    scoring each identified possible acronym and synonym pair based on the user-selected weighting factor, occurrence frequency and maximum possible length, and wherein the scoring of each identified possible acronym and synonym pair further includes only scoring pairs with a longer maximum length higher than terms with a shorter maximum length when those pairs have substantially the same occurrence frequency;
    determining that at least one of the identified acronym and synonym pairs includes a pair in which a longer maximum length higher than terms with a shorter maximum length when those pairs have substantially the same occurrence frequency;
    only ranking the at least one identified acronym and synonym pair with the longer maximum length, such that only one of those pairs that had substantially the same occurrence frequency is ranked, wherein each of the acronym and synonym pairs are ranked relative to the plurality of ranked acronym and synonym pairs; and
    displaying the ranked acronym and synonym pairs from among the plurality of ranked acronym and synonym pairs.

2. A method according to claim 1, further comprising:
    ranking the identified possible acronym and synonym pairs after determining the occurrence frequency; and
    only determining a maximum possible length for those identified possible acronym and synonym pairs exceeding a specified ranking based on the occurrence frequency.

3. A method according to claim 1, further comprising:
    allowing the user to execute a search across the corpus using at least one of the displayed ranked acronym and synonym pairs.

4. A method according to claim 1, further comprising:
    receiving from the user a minimum occurrence frequency value whereby possible acronym and synonym pairs are ranked.

5. A method according to claim 1, further comprising:
    receiving from the user a maximum term length value whereby possible acronym and synonym pairs are ranked.

6. A method according to claim 1, wherein:
    ranking each identified possible acronym and synonym pair includes ranking pairs with a longer maximum length higher than terms with a shorter maximum length when those pairs have above a minimum occurrence frequency.

7. A method according to claim 1, further comprising:
    implementing a shallow pause for each said sentence when each sentence is analyzed.

8. A method according to claim 1, further comprising:
    allowing the user to select a target corpus that is a subset of a domain.

9. A method according to claim 1, further comprising:
    allowing the user to select a target corpus that spans multiple domains.

10. A computer program product embedded in a non-transitory computer readable storage medium for identifying acronym and synonym pairs for a selected target corpus, comprising:
    program code for analyzing each sentence in a target corpus to identify possible acronym and synonym pairs;
    program code for determining an occurrence frequency of each identified possible acronym and synonym pair from among a plurality of possible acronym and synonym pairs;
    program code for determining a maximum possible length for each identified possible acronym and synonym pair;
    program code for receiving a user-selected relative weighting factor from a user for weighting an occurrence frequency relative to a maximum possible length;
    program code for scoring each identified possible acronym and synonym pair based on the user-selected weighting factor, occurrence frequency and maximum possible length, and wherein the program code for scoring of each identified possible acronym and synonym pair further includes program code for only scoring pairs with a longer maximum length higher than terms with a shorter maximum length when those pairs have substantially the same occurrence frequency;
    program code for determining that at least one of the identified acronym and synonym pairs includes a pair in which a longer maximum length higher than terms with a shorter maximum length when those pairs have substantially the same occurrence frequency;
    program code for only ranking the at least one identified acronym and synonym pair with the longer maximum length, such that only one of those pairs that had substantially the same occurrence frequency is ranked, wherein each of the acronym and synonym pairs are ranked relative to the plurality of ranked acronym and synonym pairs; and
    program code for displaying the ranked acronym and synonym pairs from among the plurality of ranked acronym and synonym pairs.

11. A computer program product according to claim 10, wherein:
    program code for ranking each identified possible acronym and synonym pair includes program code for ranking pairs with a longer maximum length higher than terms with a shorter maximum length when those pairs have substantially the same occurrence frequency.

12. A system for identifying acronym and synonym pairs for a selected target corpus, the system comprising a processor operable to execute instructions and a data storage medium for storing the instructions that, when executed by the processor, cause the processor to:
    analyze each sentence in a target corpus to identify possible acronym and synonym pairs;
    determine an occurrence frequency of each identified possible acronym and synonym pair from among a plurality of possible acronym and synonym pairs;
    determine a maximum possible length for each identified possible acronym and synonym pair;
    receiving a user-selected relative weighting factor from a user for weighting an occurrence frequency relative to a maximum possible length;

score each identified possible acronym and synonym pair based on the user-selected weighting factor, occurrence frequency and maximum possible length, and wherein the scoring of each identified possible acronym and synonym pair further includes only scoring pairs with a longer maximum length higher than terms with a shorter maximum length when those pairs have substantially the same occurrence frequency;

determine that at least one of the identified acronym and synonym pairs includes a pair in which a longer maximum length higher than terms with a shorter maximum length when those pairs have substantially the same occurrence frequency;

only rank the at least one identified acronym and synonym pair with the longer maximum length, such that only one of those pairs that had substantially the same occurrence frequency is ranked, wherein each of the acronym and synonym pairs are ranked relative to the plurality of ranked acronym and synonym pairs; and display the ranked acronym and synonym pairs from among the plurality of ranked acronym and synonym pairs.

13. A system according to claim 12, further comprising instructions that, when executed by the processor, cause the processor to:

rank each identified possible acronym and synonym pair by ranking pairs with a longer maximum length higher than terms with a shorter maximum length when those pairs have above a minimum occurrence frequency.

* * * * *

UNITED STATES PATENT AND TRADEMARK OFFICE
CERTIFICATE OF CORRECTION

| | | |
|---|---|---|
| PATENT NO. | : 8,316,007 B2 | Page 1 of 1 |
| APPLICATION NO. | : 11/770011 | |
| DATED | : November 20, 2012 | |
| INVENTOR(S) | : Liao | |

It is certified that error appears in the above-identified patent and that said Letters Patent is hereby corrected as shown below:

On Title Page 2, item (56); in column 2, under "Other Publications", line 12, delete "Boostrap," and insert -- Bootstrap, --, therefor.

In column 1, line 67, delete "many be" and insert -- may be --, therefor.

In column 3, line 30, delete "the a" and insert -- the --, therefor.

In column 6, line 49, delete "LNIX-like" and insert -- UNIX-like --, therefor.

In column 7, line 9, delete "GRPS," and insert -- GPRS, --, therefor.

Signed and Sealed this
Twelfth Day of February, 2013

Teresa Stanek Rea
*Acting Director of the United States Patent and Trademark Office*